US006544314B2

(12) United States Patent
Stendera et al.

(10) Patent No.: US 6,544,314 B2
(45) Date of Patent: Apr. 8, 2003

(54) PROCESS AND APPARATUS FOR AUTOMATICALLY CONTROLLING SLAG FOAMING

(75) Inventors: James Stendera, Baltimore, MD (US); David Viers, Hampton, VA (US); Mark Duchnak, Summerville, SC (US)

(73) Assignee: Specialty Minerals (Michigan) Inc.

( * ) Notice: Subject to any disclaimer, the term of this patent is extended or adjusted under 35 U.S.C. 154(b) by 0 days.

(21) Appl. No.: 09/810,705

(22) Filed: Mar. 19, 2001

(65) Prior Publication Data

US 2002/0040623 A1 Apr. 11, 2002

(Under 37 CFR 1.47)

Related U.S. Application Data

(60) Provisional application No. 60/189,984, filed on Mar. 17, 2000.

(51) Int. Cl.[7] .................................................. C21C 7/00
(52) U.S. Cl. ..................... 75/10.12; 75/10.62; 420/590; 266/80; 266/81; 266/90
(58) Field of Search ............................ 75/10.12, 10.62; 373/105; 266/80, 90, 81; 420/590

(56) References Cited

U.S. PATENT DOCUMENTS

| 3,781,001 | A | * | 12/1973 | Andrews et al. | ............ | 266/183 |
|---|---|---|---|---|---|---|
| 3,802,407 | A | * | 4/1974 | Imazu | .......................... | 124/48 |
| 4,362,556 | A | * | 12/1982 | Kishida | ..................... | 75/10.42 |
| 4,447,265 | A | | 5/1984 | Schwer | | |
| 4,483,709 | A | * | 11/1984 | Schempp et al. | ............. | 373/68 |
| 4,742,528 | A | | 5/1988 | Stenzel | | |
| 5,050,185 | A | | 9/1991 | Bourge et al. | | |
| 5,099,438 | A | * | 3/1992 | Gulden et al. | ............... | 373/104 |
| 5,557,631 | A | * | 9/1996 | Bulat et al. | ................... | 266/80 |
| 5,714,113 | A | | 2/1998 | Gitman et al. | | |
| 5,827,474 | A | | 10/1998 | Usher et al. | | |
| 6,004,504 | A | * | 12/1999 | Vallomy | ....................... | 266/79 |
| 6,214,084 | B1 | * | 4/2001 | Saxena et al. | ................. | 75/453 |

FOREIGN PATENT DOCUMENTS

| CA | 2129407 | 8/1994 |
|---|---|---|
| WO | WO 99/23264 | 5/1999 |

* cited by examiner

*Primary Examiner*—Roy King
*Assistant Examiner*—Andrew Wessman
(74) *Attorney, Agent, or Firm*—Marvin J. Powell

(57) ABSTRACT

A metal alloy, such as steel, is manufactured in an electric arc furnace system equipped with at least one sensor, at least one a controller including a logic program and a variable valve in fluid communication with the furnace and a material source. The nature and quality of the slag formed over a molten metal during manufacture of steel is dynamically controlled by continuously adjusting the addition of one or more material to the arc furnace through the variable valve.

7 Claims, 1 Drawing Sheet

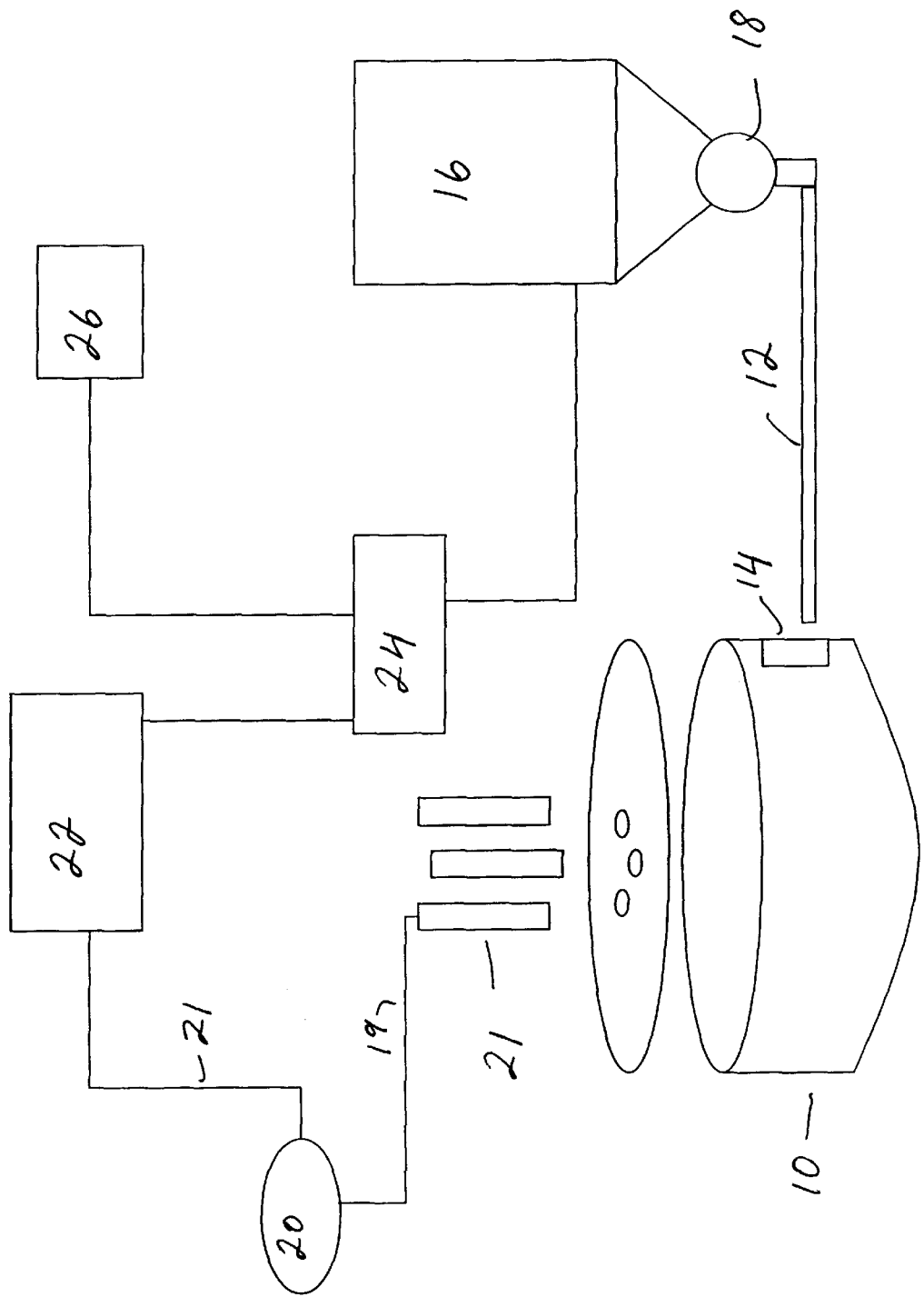
Fig. 1 Dynamic Slag Control System

PROCESS AND APPARATUS FOR AUTOMATICALLY CONTROLLING SLAG FOAMING

CROSS REFERENCE TO RELATED APPLICATION

This application claims priority from provisional patent application Serial No. 60/189,984, filed Mar. 17, 2000 entitled "PROCESS AND APPARATUS FOR CONTROLLING THE SLAG FOAMING WITHIN AC ARC FURNACES" the entire disclosure of which is incorporated herein by reference.

FIELD OF THE INVENTION

The present invention relates to a method and to an apparatus for controlling slag in an arc furnace. The present invention has particular applicability to controlling the nature and quality of the slag during the process for the preparation of metal alloys to improve reliability, consistency as well as the ultimate properties of the manufactured alloy.

BACKGROUND ART

Methods for processing steel in an electric arc furnace involve melting mostly scrap metal as the charge to form a liquid bath of the metal. Conventionally, the scrap is added to the furnace at the beginning of the process cycle and melted down by the passage of electric current through the furnace's graphite electrodes which causes an electrical arc between the electrodes and the metal. A layer of molten, non-metallic material known as slag is present over the upper surface of the molten steel formed from a mixture of the impurities separated from the metal during the refining operation. The slag is formed on the upper surface of the charge during the initial melt-down and remains on the upper surface during the entire process cycle until tapping of the heat.

In conventional steel making, the slag is foamed by the adjustment of furnace parameters and the addition of materials, e.g. liquid or gaseous chemicals, which are added during the refining process. The resulting layer of foamed slag over the upper surface of the molten steel serves the useful purposes of regulating the percentage content of alloy additives in the steel, isolating the molten steel from ambient oxygen and certain devices in the vessel containing the molten steel, and thermally insulating the steel to facilitate maintaining the steel in a molten state until poured into a desired mold.

Conventionally, the slag is foamed by a furnace operator upon visual observations of the slag itself or upon some other process parameters. For example, U.S. Pat. No. 5,827,474 to Usher et al. discloses an apparatus and method for measuring the depth of slag and molten metal in an electric arc furnace. The method includes moving a voltmeter probe through the molten metal, the interface between the molten metal and the slag foam. The change in the voltage signal between the strata, marks the position of the boundary between the molten metal and the slag foam.

Initially, visual inspection of the slag is sufficient to determine the quality of the foam. Over the process time, however, the dynamic process of steel making requires the constant adjustment of variables such as the addition of carbon or oxygen to affect the foam. When furnace operators are adjusting parameters, such as the injecting of carbon, their reaction time is relatively slow in relation to the dynamics of the foaming and alloying. To overcome, in part, some of the deficiencies of human error in foaming the slag, several models have been developed for the steelmaking process. For example, WIPO Patent Application No. WO 99/23264 to Welker discloses a method and a device for controlling the formation of foamed slag in an arc furnace employing a model to predict foaming. The reference discloses the use of a neural net and a foamed slag model to predict the correct amount of carbon to add to the furnace in order to ensure that at least partial envelopment of the arc in the slag foam is achieved. German Laid Open Patent Application (Offenlegungsschrift) DE 198 01 295 to Sesselmann discloses an arc furnace in which a neural net is used to control the position of the arc electrode, the supply of electrical energy and the amount of carbon added to the furnace. The height of the slag foam is measured using sonar.

Additional controls have been made to the furnace in the steel making process. For example, U.S. Pat. No. 5,714,113 to Gitman et al. discloses an apparatus for electric steel making, which comprises a burner/injector for introducing oxygen into the steel melt.

Sensors have also been added to the furnace, as disclosed in U.S. Pat. No. 5,050,185 to Bourge et al. which discloses a process and apparatus for measuring the instability of an arc in an electrical arc furnace for processing liquid metal. This patent discloses that arc stability may be measured by taking the derivative of the signal corresponding to the arc current, splitting the derivative signal into high and low frequency components, amplifying these separate components, and producing therefrom a signal relating to the quotient of the high and low frequency components of the derivative signal. This value represents the stability of the arc and can be used by operators to estimate the amount of carbon and oxygen to be injected into the furnace.

A method for on-line monitoring and control of the performance of an electric arc furnace can be found in U.S. Pat. No. 5,099,438 to Gulden, Jr. et al. The method of Gulden, Jr. et al. includes collecting signals relating to various furnace parameters including electrical, mechanical and physical parameters of the furnace. Such parameters include pulse rates from watt/var, current and potential transducers, transformer tap positions, arc length settings, hydraulic variables, positions of mechanical furnace components and scrap charge weights. These data are processed using programmable logic controllers (PLCs) and microcomputers.

U.S. Pat. No. 4,742,528 to Stenzel discloses a compensating device for use in a vacuum arc furnace. The compensating device compensates for the weight of a power line in a vacuum arc furnace, where accurate weights of the arc electrode are to be determined. The method uses a computer to control the intensity of current supplied to sensor electrodes.

Russian Patent RU 2086657 to Dolgonosova, et al. teaches a device for reduction of metal oxides comprising a loading device for feeding metals into a blast furnace. The device measures gas pressure fluctuations, and uses these signals via a computer to control the feed of oxygen gas into the furnace.

The aforementioned references, however, do not adequately correlate or control the various dynamic aspects of the arc furnace or the dynamic properties of the molten steel or slag to improve the nature or quality of the foamed slag in the manufacture of steel. Accordingly, a continuing need exists for dynamically improving the quality and nature of the foamed slag during the steel making process thereby improving consistency, reliability and throughput for the finished product.

DISCLOSURE OF THE INVENTION

An advantage of the present invention is a method of dynamically and more precisely controlling the foaming of slag in an arc furnace.

Additional advantages and other features of the invention will be set forth in the description which follows and in part will be apparent to those having ordinary skill in the art upon examination of the following or may be learned from the practice of the present invention. Advantages of the present invention may be realized and particularly pointed out in the appended claims.

According to the present invention, the foregoing and other advantages are achieved in part by a method of dynamically controlling the foaming of slag in an arc furnace in the formation of an alloy, such as steel. The method comprises obtaining one or more signal(s) related to variables representing the nature or quality of the slag; feeding the one or more signal(s) into a controller comprising a logic program to generate an output signal representative of the quality or nature of the slag; and adding one or more materials to the electric arc furnace through a valve that has a flow rate that can be variably adjusted to dynamically control the quality or nature of the slag by continuously adjusting the addition of the one or more material in response to the output signal generated by the controller. The method of the present invention thereby dynamically and more precisely controls the quality and nature of the slag, its foaming and the ultimate finished product.

Embodiments of the present invention include employing signals relating to arc stability, slag foam viscosity and temperature as indicators of slag foam quality and continuously controlling the amount of materials to be injected into the furnace to affect the nature and quality of the slag, as by a variable flow rate valve. Further embodiments of the invention employ oxygen, carbon, magnesium oxides, calcium oxides and lime as inputs for controlling the nature or quality of slag foam. The invention also contemplates automatic and manual controls as means for controlling the introduction of inputs to control of the slag foam.

A further aspect of the present invention is a method of manufacturing a metal alloy by forming a molten metal liquid having a slag thereover in an electric arc furnace and dynamically adjusting the foaming of the slag during the process by injecting material, e.g. carbon, through a valve capable of continuously and variable adjusting the flow rate, e.g. from about 25 pound/minute (lbs/min) to about 200 lbs/min, of the injected material.

Another aspect of the present invention is an apparatus comprising an electric arc furnace having a variable valve in fluid communication with the furnace and a material source that can be controlled to variably adjust the amount of material added to the furnace during a metal processing. Embodiments include an apparatus comprising: an electric arc furnace capable of forming a molten metal covered, in part, by a slag; a sensor in electrical communication with the furnace and capable of sensing the nature or quality of the slag; a material handling and controlling equipment in fluid communication with the furnace for housing and adding material to the furnace to foam the slag and including a variable valve for varying the amount of material added to the furnace; and a programmable logic controller electrically coupled to the sensor and the material handling and controlling equipment for receiving and processing signals from the sensor as to the nature or quality of the slag and for regulating the amount of material added to the furnace by the material handling and controlling equipment through the variable valve.

Additional advantages and other features of the present invention will become readily apparent to those skilled in this art from the following the detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description should be regarded as illustrative in nature, not as restrictive.

BRIEF DESCRIPTION OF DRAWINGS

FIG. 1 schematically illustrates a dynamic slag control system in accordance with an embodiment of the present invention.

DESCRIPTION OF THE INVENTION

The present invention advantageously enables the dynamic and precise control of the quality or nature of the foamed slag during the manufacture of metal alloys such as steel. The present invention automatically maintains the optimum foaming levels of the slag over the molten metal by continually monitoring one or more foaming parameters and continually and variably adjusting process input parameters. The present invention contemplates monitoring furnace parameters, such as, but not limited to, the stability of the furnace arc, furnace temperature, etc. as well as monitoring the slag parameters, such as slag viscosity. Based on the ever-changing status of the molten metal bath, a logic controller determines the type, time and amount of materials that are injected or otherwise made available to the molten metal or slag thereby eliminating human error. In an embodiment of the present invention, the amount of introduced material is regulated on a continues and variable basis, rather than by the conventional on/off blast injectors, to provide a foamy, non-corrosive slag. The present invention enables the use of longer electrode arcs and, by burying those arcs in the foamed slag, reduces or eliminates splatter of the charge while minimizing electrode oxidation and consumption and maintaining high temperatures and reduces the waste associated the addition of too much material.

Embodiments of the electrical furnace system of the present invention is illustrated in FIG. 1 and comprises furnace 10 and a control system. The furnace contains at least one electrode therein and houses the molten metal and, during processing, a layer of slag over the upper surface of the molten metal (not shown for illustrative convenience). In an embodiment of the present invention, a plurality of electrodes are used in the furnace.

In practicing the invention, an electrical arc is generated between the electrodes and the metal causing the metal to liquefy. The slag which forms substantially over of the liquid metal bath undergoes, during the refining of the metal, a foaming caused by the chemical reactions in the liquid metal and in the slag, which are facilitated or the result of injecting materials, such as oxygen and carbon, through at least one blast pipe 12 into the liquid metal or into the slag or both through port 14. The blast pipe provides a fluid communication between furnace 10 and material handling and containing equipment 16 which holds one or more materials to be injected into the furnace.

The injection of oxygen, for example, causes the formation of iron oxide which passes into the slag, where as the injection of carbon, such as from charcoal, causes the formation of a carbon oxide, such as carbon monoxide or dioxide, which causes the slag to foam. The arc between the electrodes and metal charge, thus, can be to a greater or lesser extent enveloped in the layer of slag during the refining process.

Additional blast pipes can also be added in fluid communication with the furnace for injecting multiple materials simultaneously or individually. The present invention contemplates several blast pipes in fluid communication with the furnace and corresponding material handling and containing equipment. As inputs for controlling the quality of slag foam, the materials that can be injected during the process include, for example, oxygen, carbon, iron oxides, magnesium oxides, calcium oxides, lime, etc.

Additional materials that can be added to affect the quality and nature of the slag of the present invention comprise compositions useful in the steelmaking process, such as from about 15 to about 80 wt % of a carbon source with the remainder comprising a source of an oxide of calcium. The source of an oxide of calcium that can be used includes, for example, standard lime (95 weight percent (wt %) CaO), dolomitic lime (approximately 60 wt % CaO, 40 wt % MgO) and mixtures thereof, as well as other calcium oxide sources known in the steelmaking art. Either lime can be utilized in calcined or hydrated form. The carbon that can be used in the present invention includes any type of carbon and particularly from those carbon sources known in the steelmaking art, as for example, charcoal, wood, petroleum coke, graphite, anthracite coal and mixtures thereof.

In an embodiment of the present invention, material handling and containing equipment 16 includes variable valve 18 to regulate, in a variable manner, the amount of material added to the furnace. The variable valve can be placed anywhere between the furnace and the material to be added to the furnace. The present invention contemplates that the volume of material that is continuously controlled through the valve will depend on the nature of the material and the size of the charge.

In an embodiment of the present invention, the variable valve is a rotary valve that is capable of adding the desired material to the furnace during the process at a continuous and variable flow rate, rather than a conventional discrete on/off rate. In an embodiment of the present invention the valve can be controlled to continuously adjust the flow rate of the inject material, e.g. carbon, over the range of up to 200 lbs/min or more, e.g. from about 25 lbs/min to about 200 lbs/min.

The present invention automatically maintains optimum slag foam levels by continually monitoring furnace parameters such as, but not limited to, the stability of the furnace arc, the temperature and the slag viscosity. To monitor the development of the foaming of the slag and thus to permit interventions in the course of the process, the invention provides an electrical system including one or more sensors 20 connected, for example, to one or more probes 21 or to one or more electrodes through electrical furnace buss tube 19. The system can include a detector 22, e.g. a foaming indicator, in electrical communication 21 with sensor 20.

Sensor 20 is capable of generating a detectable signal representative of the nature or quality of the slag as, for example, generating a detectable signal representative of the intensity of the current passing through the arc. In an embodiment of the present invention, sensor 20 is of the inductive type as, for example, a Rogowski torus, that is to say an electromagnetic ammeter which is capable of measuring the derivative of the current, and its harmonics. The use of a sensor of this type exhibits, in particular, the advantage of increasing the accuracy of the measurement of the fluctuations of the current. The input from the Rogowski coil to the detector can be from about 0 to about 10 volts.

The processing of the signal, for carrying out the process, is achieved by one or more conventional programmable logic controllers (PLC's) and, optionally, with one or more conventional data processing microprocessors or logic circuits, shown as single block 24. A PLC enables continuous on-line monitoring of various furnace conditions and also serves as an input processor for higher level computers which can, if desired, perform heavy-duty data processing for higher-level on-line control. PLC's are generally configured to withstand the rigors of the furnace area environment. The PLC's function is to perform high speed data collection of electrical, mechanical, and physical parameters of the furnace, such as, but not limited to, pulse rates from watt/var, current and potential transducers, transformer tap positions, arc length settings, hydraulic variables, positions of mechanical furnace components, and scrap charge weights and present the collected data to a data processing microprocessor or logic circuit in a usable format.

In an embodiment of the present invention, PLC 24 processes all data received through an I/O Interface (not shown for illustrative convenience) during a time cycle. The data received and processed by PLC (C) includes, but is not limited to, pulse strings representing the furnace's electrical energy consumption, analog and digital signals representing furnace status and/or condition, and timing values representing the duration or absence of an event or delay. The processing of all received data is accomplished by monitoring the incoming data over a fixed time cycle and converting the data into data sets or values representing appropriate engineering units.

In addition to data collection and processing, the system can further process the data, as by conventional computers having logic circuits or microprocessors to receive the data transmitted by the PLC. It is contemplated that the PLC can contain the logic circuits necessary to process the data in a cost effective manner and provide the operator with control of the information corresponding to the above identified variables by way of reports, displays and/or commands. In an embodiment of the present invention, PLC 24 is electrically coupled to a user interface 26. The input from the user interface to the PLC can be any range of electrical signal, such an 110 volt AC input.

In accordance with the present invention, PLC 24 is electrically coupled to material handling and containing equipment 16. In an embodiment of the present invention, the output from the PLC to equipment 16 is approximately 4–20 mV for flow control and about 0–10 V for on/off control. In practicing the invention, PLC 24 obtains one or more signals related to variables representing the nature or quality of the slag from sensor 20 and processes or feeds the obtained one or more signal(s) into a controller comprising a logic program to dynamically control the quality or nature of the slag by continuously sending an output signal to equipment 16 to regulate, in a variable manner, the amount of material to be added or reduced to the furnace.

The present invention contemplates integrating at least one sensor, at least one PLC and at least one material handling equipment to provide on-line data collection and data communication between the programmable logic controller with or without an extra data processing computer for controlling the furnace together with controlling the time and amount of a particular additive material to the furnace to affect the foaming of the slag.

The present invention advantageously automatically maintains optimum slag foam levels by continually monitoring furnace parameters such as, but not limited to, the stability of the furnace arc, the temperature and the slag viscosity. Based on the ever-changing status of the molten steel bath, a logic controller determines what types of materials should be injected into the furnace, when they are to be injected and in what amount. The controller activates a valve capable of adding the materials over a specified range rather than conventional abrupt on/off blast pipes thereby reducing or eliminating the waste and improving the accuracy and control over the process. The specified range wherein the valve is activatable depends upon the nature of the added material and the size of the charge.

The present invention advantageously eliminates the human error associated with determining when the slag is foamed well. Also, in almost all instances, adjustment of the injection of carbon and oxygen by the operator are the only means for controlling the slag foam. This invention will also be able to adjust the slag chemistry by the injection of materials such as, but not limited to MgO, lime and FeO.

EXAMPLE

A prototype of an arc furnace system was installed in a steel mill where the furnace included a standard 6,000 lbs (refractory material) dry gun, a programmable logic controller (P.L.C.), user interface switches, a foaming indicator and Rogowski coil. There were two settings for the user interface; manual and automatic. In the manual setting, the injection of carbon is controlled by the operator. In the automatic setting, the carbon injection is controlled by the PLC. The system successfully controlled the slag foaming while in the automatic setting.

After experimentation, it was discovered that the standard dry gun did not have a large enough capacity as with nearly every heat, the gun had to be refilled. Accordingly, in an embodiment of the present invention a larger, e.g. greater than 6,000 lbs, dry gun is used. It was further observed that if the system is placed into the automatic setting while there is still scrap in the furnace, the system will identify the scrap as poor arc stability due to a lack of foamed slag. The system will then inject excessive amounts of carbon in an attempt to foam the slag which results in a waste of carbon and excess carbon contamination within the steel itself. To circumvent the misreading of the slag, an alarm system has been written into the P.L.C. program that will alert the operator when the system is in the automatic settings and the level of foaming is not approaching optimum levels.

It has also been observed that the flow rate of carbon through a butterfly or a knife-gate valve is either zero pounds per minute or the maximum volume that the valve will allow (i.e., approximately 200 lbs/min). In an embodiment of the present invention, the flow rate of carbon is precisely controlled over a range of 25 to 200 lbs/min by a rotary valve with differential speed control. In one experiment, the flow rate was controlled to a maximum of 140 lbs/min instead of 200 lbs/min to achieve control over the foaming of the slag.

Only the preferred embodiment of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A method of manufacturing a metal alloy in an electric arc furnace having a molten metal and a slag over the upper surface of the molten metal, the method comprising:

obtaining one or more electrical signal(s) through a sensor(s) in electrical communication with the molten metal and a programmable logic controller (PLC), the sensor(s) being capable of measuring arc stability, slag foam viscosity and/or temperature, the PLC generating an output signal relating to variables representing the nature or quality of the slag;

transferring the output signal of the programmable logic controller to material handling and controlling equipment;

adding one or more materials from the material and handling equipment to the electric arc furnace through a blast pipe that is in fluid communication with the furnace and material handling and controlling equipment, the blast pipe containing a valve that has a flow rate that is variably adjusted to dynamically control the quality and nature of the slag by continuously adjusting the addition of the one or more materials in response to the output signal generated by the programmable controller.

2. The method according to claim 1, comprising adding a source of carbon into the electric arc furnace to foam the slag as the added material.

3. The method according to claim 1, comprising adding the source of carbon into the electric arc furnace to foam the slag by continuously injecting carbon over a flow rate of about 25 lbs/mm to about 200 lbs/min.

4. The method according to claim 1, comprising adding the material through a rotary valve.

5. The method according to claim 1, comprising injecting material selected from the group consisting of oxygen, carbon, iron oxide, magnesium oxide, calcium oxide, lime or combinations thereof to control the quality of the slag.

6. The method according to claim 1, comprising supplying the electric arc furnace with scrap steel and melting the scrap steel to form a molten metal and a slag over the upper surface of the molten metal.

7. The method according to claim 1, comprising injecting carbon or oxygen or both to foam the slag.

* * * * *